Jan. 17, 1956　　　A. D. REDNER　　　2,731,152
FILTER ELEMENT AND METHOD OF MANUFACTURE
Filed March 14, 1949
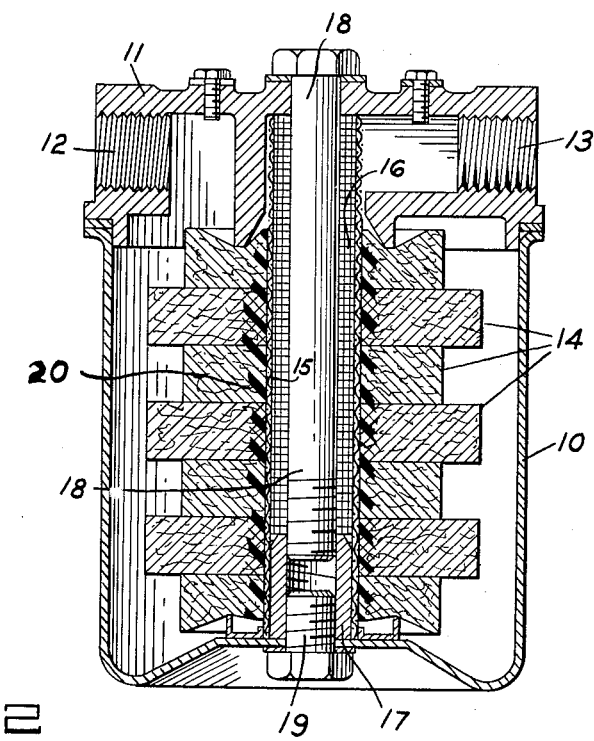
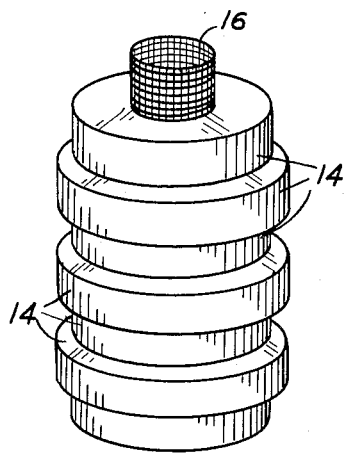
INVENTOR.
ARTHUR D. REDNER
BY
*Harley, Forster & Farley*
ATTORNEYS

United States Patent Office 2,731,152
Patented Jan. 17, 1956

2,731,152

FILTER ELEMENT AND METHOD OF MANUFACTURE

Arthur D. Redner, Farmington, Mich., assignor to General Filters, Inc., Detroit, Mich., a corporation of Michigan Application March 14, 1949, Serial No. 81,242

7 Claims. (Cl. 210—120)

This invention relates to filters, and more particularly to filters employing one or more elements of fibrous material.

Wherever fluid is being filtered through a fibrous element, one of the problems which must be met is the possibility of fibrous particles breaking loose from the filtering element and passing into the clean fluid stream. Thus, while a given fibrous element may be effective to filter out particles of dirt from the stream of fluid passing through, its usefulness may be at least partially defeated if fibrous particles of the filtering element itself pass into the clean fluid stream.

One of the conventional methods of meeting this problem is to employ a fine mesh screen between the fibrous filter element and the clean fluid stream. For example, one conventional design for fluid filters employs a substantially cylindrical fibrous filter element with a passage through the axial center thereof, a screen tube being inserted in such passage. The fluid to be filtered is directed to the outside of said cylindrical element, the filtered fluid being taken from the inside of the screen tube. While this method is generally effective to keep the fibrous particles of the filter element adjacent the screen from passing into the clean fluid stream, it sometimes happens that short fibers may be left from the operation of cutting out the center passage which may project through the screen upon its introduction into the center of the filtering element or that continuous flow of fluid through the filter may in time dislodge certain of said fibers when they are not securely anchored to the main body of the filter element.

The present invention is directed to positively prevent this chance dislodging of fibrous particles, and consists of the extremely simple method of spraying an adhesive liquid into the exposed surface of the screen after it is assembled to the fibrous filtering element to positively prevent the dislodging of any fibrous particle.

It is preferable that such liquid will not only adhere to the screen but that it also penetrate into the fibrous filter element to some extent, thereby to secure the fibers adjacent the screen to each other as well as to the screen in the case of projecting fibers. Such action in effect secures any loose and independent fibers into a continuous porous honeycomb structure for a short distance adjacent the screen so that any short fibers left by the process of cutting out the center passage of the filtering element cannot be washed through the screen upon placing the filter into operation.

Thus the principal object of my invention is to provide a method in the manufacture of filters employing fibrous filtering elements which will positively prevent the dislodging of fibers of the filtering element adjacent the clean fluid stream.

Another object is to provide a filter employing a fibrous filtering element wherein a portion of such filtering element adjacent the clean fluid stream has been treated to interconnect the individual fibrous particles in a manner adapted to prevent the dislodging of said particles.

Another object is to provide a filter employing a fibrous filtering element wherein a fine mesh screen is interposed between the filtering element and the clean fluid stream, and wherein the fibrous elements adjacent such screen are interconnected to each other as well as to such screen to prevent the dislodging of the individual fibrous particles.

These and other objects will appear more clearly from the following description of a specific embodiment and from an examination of the drawing illustrating such embodiment, wherein Fig. 1 is a cross-sectional view of a typical filter employing my invention; and Fig. 2 is a perspective view of the filtering element proper.

With reference to the drawings, it will be seen that the filter illustrating a typical application of my invention includes a body 10, a cap 11, and an inlet port 12 and an outlet port 13. A filtering element is employed which consists of a series of annular felt discs 14 stacked together, each having a central bore punched out to form a cylindrical opening 15 into which a fine mesh screen 16 is inserted. An internally threaded bushing 17 engages a pair of bolts 18 and 19 which hold the cap 11 and body 10 in assembled relationship.

Fluid to be filtered flows through the inlet 12, from the outside to the inside of the fibrous disc 14, into the interior of the screen tube 16, and thence to the outlet 13.

Referring to the filtered cartridge shown in Fig. 2 which is preassembled and may be removed from the filter body for cleaning or replacement, the following methods of manufacture and assembly are employed.

The felt discs 14 having been preformed with central openings 15 are stacked in the manner shown over screen tube 16. A snug fit between the screen and felt discs may cause a number of fibrous particles of such discs to break loose and/or extend through into the interior of the screen tube 16. Loose particles are blown and brushed out, whereupon the filtering element is in condition for the application of the liquid coating which forms the essential novel feature of the present invention.

The liquid employed should have wetting and viscosity properties which permit it to coat strands of the screen without clogging the openings, penetrate to some depth the fibrous material as indicated by heavy lines 20, and upon drying it should have adhesive qualities capable of securely holding the fibrous particles to the screen and to each other. In addition, it should be non-soluble in the fluid to be filtered. I have found, for example, that a suitable material for use in a fuel oil filter is a paint sealer having the following analysis:

|  | Percent |
|---|---|
| Pigment—iron oxide | 2.5 |
| Plasticizing oil—vegetable oil | 7.6 |
| Resin—nitro cellulose | 6.4 |
| Volatile: | |
|     Esters | 20.7 |
|     Alcohol | 38.2 |
|     Hydrocarbons | 24.6 |
|  | 100.0 |

For the particular application described herein, I have found that a nozzle adapted to spray at right angles to the wall of the screen tube 16 is desirable in securing through coverage and proper penetration, and that the liquid sealer set forth above will upon hardening securely interconnect the fibrous particles adjacent the screen tube to each other and to the tube without, to any appreciable extent, reducing the capacity of the filter; and tests have demonstrated that after such coating treatment, no individual fibrous particle will be induced to flow into the interior of the screen tube as the result of the flow of oil passing through the filter.

It will be understood that other materials might be employed to obtain similar results; that it might be desirable to change the constituents of the coating liquid in accordance with the chemical properties of the particular fluid to be filtered; and that changes in the constituents of the coating liquid, the particular method of this application and the form of the fibrous filtering element to which it is applied may be made without departing from the scope of this invention as defined by the following claims.

I claim:

1. A liquid filter cartridge comprising a fibrous filter element having exposed inlet and outlet surfaces, a screen covering said outlet surface, said screen and said outlet surface being treated to a limited depth with an adhesive material insoluble in the liquid to be filtered, said adhesive securing the individual fibrous particles in said outlet surface to each other and to said screen in a manner adapted to prevent them from becoming dislodged for flow into the clean liquid stream.

2. A liquid filter cartridge comprising a plurality of stacked filter pads made of a fibrous material, each of said pads having a central opening forming together a tubular passage in said stack, a screen tube fitting snugly within said tubular opening, said screen and fibrous material adjacent thereto being treated to a limited depth with an adhesive material insoluble in the liquid to be filtered, said adhesive securing the individual fibrous particles to each other and to said screen in a manner adapted to prevent them from becoming dislodged for flow into the clean liquid stream.

3. An oil filter cartridge comprising a fibrous filter element having exposed inlet and outlet surfaces, a screen covering said outlet surface, said screen and outlet surface being treated to a limited depth with an adhesive material of a paint sealer type having nonvolatile constituents insoluble in oil, said adhesive securing the individual fibrous particles in said outlet surface to each other and to said screen in a manner adapted to prevent them from becoming dislodged for flow into the clean oil stream, and said adhesive being applied in a volatile carrier in a thin consistency to avoid clogging or materially reducing the flow of oil therethrough.

4. A filter cartridge as set forth in claim 3 wherein the adhesive has nonvolatile constituents including a nitrocellulose resin and a plasticizing vegetable oil.

5. The method of manufacturing a liquid filter cartridge consisting in stacking a plurality of pads made of fibrous filter material having pre-cut central openings over a screen tube fitting snugly therewithin, partially removing any loose fibrous particles dislodged during the insertion of said screen tube by suitable means, and spraying the interior of said tube with a suitable liquid adhesive having a volatile carrier and nonvolatile adhesive ingredients insoluble in the liquid to be filtered, said liquid adhesive being of a thin consistency to facilitate penetration of the screen and fibrous pads to a limited depth so as upon drying to secure the fibrous particles to each other and to said screen without substantially reducing the flow capacity of the filter, thereby to prevent any remaining loose particles of the filter material from being carried by the liquid stream passing through the filter into the outlet opening of said screen tube.

6. The method of manufacturing a liquid filter cartridge consisting in covering a screen tube with fibrous filter material, partially removing any loos fibrous particles dislodged during assembly with said screen tube by suitable means, and spraying the interior of said tube with a suitable liquid adhesive having a volatile carrier and nonvolatile adhesive ingredients insoluble in the liquid to be filtered, said liquid adhesive being of a thin consistency to facilitate penetration of the screen and fibrous material to a limited depth so as upon drying to secure the fibrous particles to each other and to said screen without substantially reducing the flow capacity of the filter, thereby to prevent any remaining loose particles of the filter material from being carried by the liquid stream passing through the filter into the outlet opening of said screen tube.

7. The method of manufacturing a liquid filter cartridge consisting in stacking a plurality of pads made of fibrous filter material, having pre-cut central openings over a screen tube fitting snugly therewithin, partially removing any loose fiber particles dislodged during the insertion of said screen tube by suitable means, and spraying the interior of said tube with a suitable liquid adhesive of the paint sealer type having a volatile carrier and nonvolatile adhesive ingredients insoluble in the liquid to be filtered, said liquid adhesive being sprayed radially outwardly from the axis of said screen tube in a thin consistency to facilitate penetration of the screen and fibrous pads to a limited depth so as upon drying to secure the fibrous particles to each other and to said screen without materially reducing the flow capacity of the filter, thereby to prevent any remaining loose particles of filter material from being carried by the liquid stream passing through the filter into the outlet opening of said screen tube.

References Cited in the file of this patent

UNITED STATES PATENTS

| 2,069,771 | Pascoe et al. | Feb. 9, 1937 |
| 2,128,290 | Fessler | Aug. 30, 1938 |
| 2,148,708 | Orr | Feb. 28, 1939 |
| 2,195,272 | Ehlers | Mar. 26, 1940 |
| 2,236,892 | Broeman | Apr. 1, 1941 |
| 2,266,313 | Ehlers | Dec. 16, 1941 |
| 2,361,092 | Gilbert et al. | Oct. 24, 1944 |
| 2,375,246 | Kasten | May 8, 1945 |
| 2,394,009 | Pollard | Feb. 5, 1946 |
| 2,395,301 | Sloan | Feb. 19, 1946 |
| 2,395,449 | Briggs | Feb. 26, 1946 |
| 2,426,405 | McDermott | Aug. 26, 1947 |
| 2,468,328 | Hill | Apr. 26, 1949 |
| 2,468,920 | Brown et al. | May 3, 1949 |
| 2,554,016 | Czarnecki, Jr., et al. | May 22, 1951 |

FOREIGN PATENTS

| 498,634 | Great Britain | Jan. 11, 1939 |